(12) United States Patent
Huang et al.

(10) Patent No.: US 7,397,205 B2
(45) Date of Patent: Jul. 8, 2008

(54) ILLUMINATION BRIGHTNESS AND COLOR CONTROL SYSTEM AND METHOD THEREFOR

(75) Inventors: Jui-Feng Huang, Hsinchu (TW); Chun-Te Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 3 days.

(21) Appl. No.: 11/500,453

(22) Filed: Aug. 8, 2006

(65) Prior Publication Data

US 2007/0126656 A1 Jun. 7, 2007

(30) Foreign Application Priority Data

Dec. 7, 2005 (TW) .............................. 94143235 A

(51) Int. Cl.
*H05B 37/02* (2006.01)
(52) U.S. Cl. .................. 315/360; 315/152; 315/307
(58) Field of Classification Search ................. 315/149, 315/152, 291, 307, 308, 360
See application file for complete search history.

(56) References Cited

U.S. PATENT DOCUMENTS

| | | | |
|---|---|---|---|
| 6,127,783 A | 10/2000 | Pashley et al. | |
| 6,166,496 A * | 12/2000 | Lys et al. | ..................... 315/316 |
| 6,441,558 B1 | 8/2002 | Muthu et al. | |
| 6,445,139 B1 | 9/2002 | Marshall et al. | |
| 6,448,550 B1 | 9/2002 | Nishimura | |
| 6,495,964 B1 | 12/2002 | Muthu et al. | |
| 6,630,801 B2 | 10/2003 | Schuurmans | |
| 6,633,301 B1 | 10/2003 | Dallas et al. | |
| 6,753,661 B2 | 6/2004 | Muthu et al. | |
| 6,894,442 B1 | 5/2005 | Lim et al. | |
| 6,992,803 B2 | 1/2006 | Chang | |
| 7,002,546 B1 | 2/2006 | Stuppi et al. | |
| 7,108,413 B2 | 9/2006 | Kwong et al. | |
| 2005/0225264 A1 * | 10/2005 | Kemp | ......................... 315/291 |
| 2007/0188759 A1 * | 8/2007 | Mehendale et al. | ......... 356/409 |

* cited by examiner

*Primary Examiner*—Thuy Vinh Tran
(74) *Attorney, Agent, or Firm*—Birch, Stewart, Kolasch & Birch, LLP

(57) ABSTRACT

An illumination brightness and color control system for adjusting the illumination of a plurality of point light sources and method therefor are provided, implemented in a time division manner. A single photosensor senses and samples a point light source for the luminous intensity signal value. Then, the luminous intensity signal value at each wavelength and a target brightness/color value are compute to acquire a corrected current value, and the corrected current value is fed back to a light source driver. Therefore, the brightness/color value of the point light sources is adjusted to be in a steady state.

9 Claims, 4 Drawing Sheets

ILLUMINATION BRIGHTNESS AND COLOR CONTROL SYSTEM AND METHOD THEREFOR

CROSS-REFERENCE TO RELATED APPLICATIONS

This non-provisional application claims priority under 35 U.S.C. § 119(a) on Patent Application No(s). 094143235 filed in Taiwan, R.O.C. on Dec. 7, 2005 the entire contents of which are hereby incorporated by reference.

BACKGROUND OF THE INVENTION

1. Field of Invention

The present invention relates to a brightness and color control system and method therefor, and more particularly to a brightness and color control system of a point light source (for example, a multi-wavelength diode light source) and method therefor.

2. Related Art

The currently used diode lighting module as light source adds greater value to liquid crystal panels due to the advantages of high luminance, mercury free, high color reproducibility, and high resolution refinement, etc., such that the applications of the diode lighting module go beyond the field of portable electronic product and quickly extend to other fields, such as transportation equipment (vehicles, aircrafts, and mass rapid transit etc.), displays, mini-projection systems, televisions, and so on. However, the problem of unsteady brightness caused by temperature, aging, etc., affects the lighting quality of the diode lighting module. Therefore, it has become a trend for future research to effectively control the brightness of the monochrome luminous diode, to compensate for unsteady brightness, thereby improving the lighting quality of the diode lighting module.

Referring to U.S. Pat. No. 6,753,661, it discloses a backlight illumination feedback control system, wherein a multi-wavelength diode driver and a group of three-wavelength sensors are used to read the luminous intensity and color components for computing, thereby feed-back controlling the multi-wavelength diode driver, thus achieving the effect of uniform, steady brightness and color. Multiple groups of three-wavelength sensors are used in this method to read the luminous intensity and color components, such that it is relatively complicated in calibration, and it cannot be applied to the color sequence technique.

Referring to U.S. Pat. No. 6,894,442, it discloses an illumination control system, wherein a multi-wavelength diode driver and a multi-wavelength monitor are used to effectively read, compute, and control the duty cycle of each wavelength, thereby achieving the effect of steady brightness and color. However, the multi-wavelength monitor used in this method must cooperate with several photosensors in different wavelengths, such that it is still relatively complicated in calibration, with high cost, and it cannot be applied to the color sequence technique.

Therefore, it is one of the problems to be solved by researchers how to provide a brightness and color control system and method therefor, to reduce the number of photosensors, thereby reducing the cost of the control system, simplifying the calibration process, and meanwhile improving the lighting quality of the diode lighting module.

SUMMARY OF THE INVENTION

In view of the above, the object of the present invention is to provide an illumination brightness and color control system and method therefor, wherein a single broadband sensor is used to sense and sample a point light source for the lighting emitting state in a time division manner, and to carry out feedback control so as to adjust the illumination brightness of the point light source, thereby reducing the cost of the control system.

Therefore, to achieve the above object, the illumination brightness and color control system disclosed in the present invention is to adjust the illumination brightness of a point light source according to the target brightness/color value, which includes: a timing sampling controller, for setting the control timing and sampling timing of the point light source and generating a plurality of different control timings, which are different from each other; a light source driving unit, for driving the point light source to emit lights at different time in response to the driving current generated by the control timing; a broadband light source monitor, for sensing and sampling the point light source that is emitting lights at a specific time for the luminous intensity signal value in response to the sampling timing; a computing unit, for computing according to the difference between the brightness/color value and the luminous intensity signal value, so as to acquire a corrected current value; and a current adjuster, for adjusting the driving current generated by the light source driver according to the corrected current value.

The illumination brightness and color control system further includes: a synchronizing unit, for providing a synchronous timing to the computing unit and the timing sampling controller as the reference for timing adjustment; and an analog/digital converting unit, for converting the luminous intensity signal value into a digital signal and outputting the digital signal to the computing unit.

Furthermore, to achieve the above object, the illumination brightness and color control method disclosed by the present invention is to set a control timing and a sampling timing, and to sense the point light source with a single broadband photosensor, and to feedback control the illumination brightness of the point light source, which includes the following steps: first, generating a driving current in response to the control timing, for driving the point light source to emit lights at different time; sensing and sampling the point light source that emits lights at a specific time for the luminous intensity signal value in response to the sampling timing; computing the luminous intensity signal value and the target brightness/color value, for acquiring a corrected current value; and correcting the driving current according to the corrected current value, for adjusting the illumination brightness.

Moreover, to achieve the above object, the embodiment disclosed in the present invention mainly employs a broadband photosensor to sense each point light source for the luminous intensity signal value in a time division manner, and computes the luminous intensity signal value and the target brightness/color value, for feedback controlling the illumination brightness of the point light source, thereby uniformly and steadily mixing the multi-color diode into a white light with desired color temperature and intensity to act as the illumination light source.

According to the illumination brightness and color control system and method therefor, a single broadband photosensor is used to respectively sense and sample the diodes in each wavelength for the luminous intensity signal values in a time division manner. Then, the luminous intensity signal value is computed with the target brightness/color value, for feedback controlling the illumination brightness of the point light source. The advantage for using a single broadband photosensor is that, the calibration process is easy and simple, and the manufacturing cost of the illumination brightness and color control system also can be reduced.

The features and practice of the preferred embodiment of the present invention will be illustrated in detail below with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
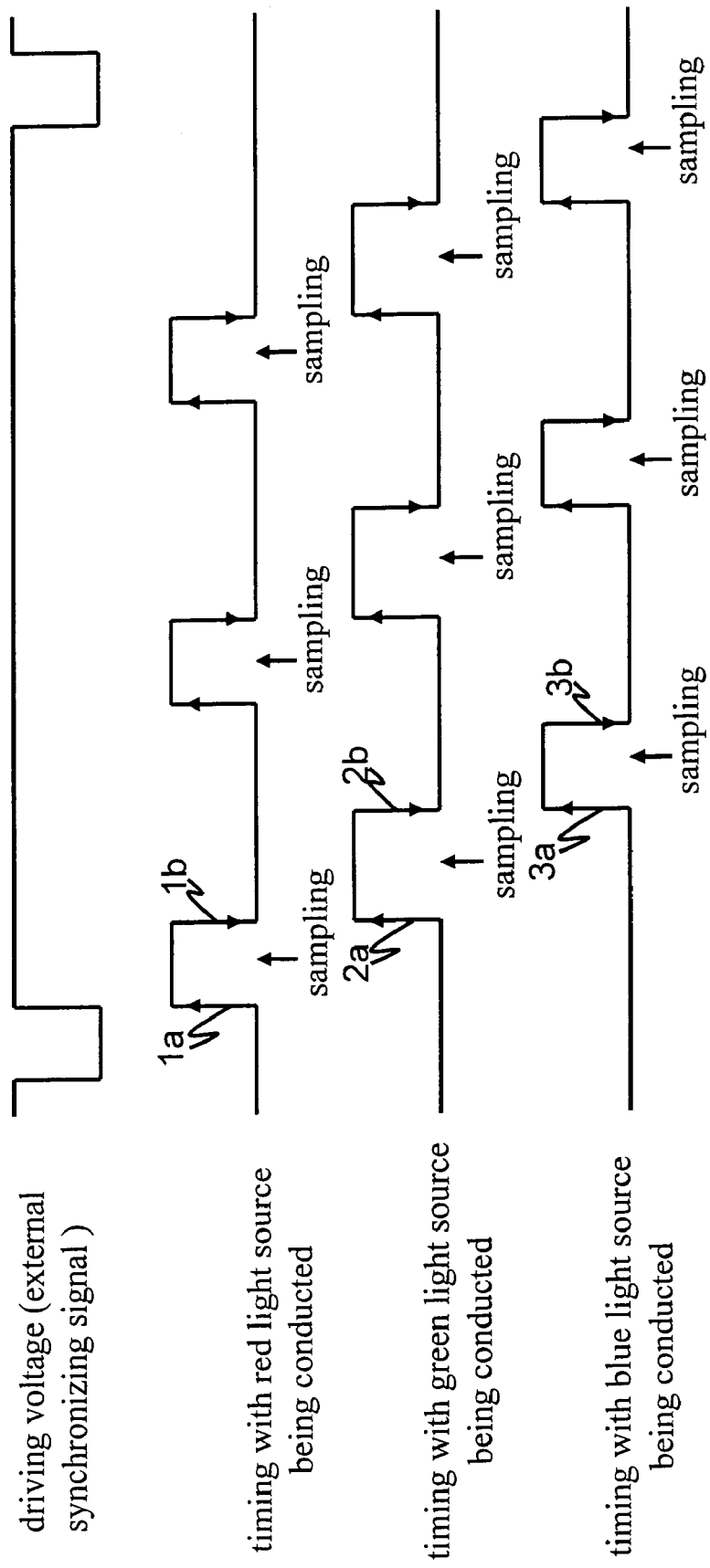
FIG. 1 is a schematic view of the sampling timing of the light source signal according to an embodiment of the present invention.

Referring to FIG. 1, it is a schematic view of the sampling timing of the light signal according to an embodiment of the present invention, wherein the point light source can be implemented by a multi-wavelength diode, and the conducting time for the diodes in each wavelength varies depending on the different luminous efficiency of each diode. First, a first rising trigger signal 1a is generated, for driving the red light diode (not shown) to be conducted for a predetermined time period; the sensing and sampling are carried out when the red light diode has been conducted, for acquiring the luminous intensity signal value generated by the red light diode.

Then, a first falling trigger signal 1b is generated, for turning off the red light diode; meanwhile, a second rising trigger signal 2a is generated, for driving a green light diode (not shown) to be conducted for a predetermined time period; and the sensing and sampling are carried out when the green light diode has been conducted, for acquiring the luminous intensity signal value generated by the green light diode.

Next, a second falling trigger signal 2b is generated, for turning off the green light diode; meanwhile, a third rising trigger signal 3a is generated, for driving a blue light diode (not shown) to be conducted for a predetermined time period; and the sensing and sampling are carried out when the blue light diode has been conducted, for acquiring the luminous intensity signal value generated by the blue light diode; finally, a third falling trigger signal 3b is generated, for turning off the blue light diode; and then, the sensing and sampling are repeatedly carried out according to the driving sequence of red, green, and blue light sources, and the luminous intensity signal value is transferred to the computing unit 15 via the analog/digital converter 12 to be computed, so as to acquire a corrected current value, thereby adjusting the illumination brightness of the point light source. Furthermore, the above-mentioned embodiment is used as an example for illustration only, but not intended to limit the luminous sequence, sensing sequence, and sampling sequence of the diode light source in each wavelength.

Figure 2:
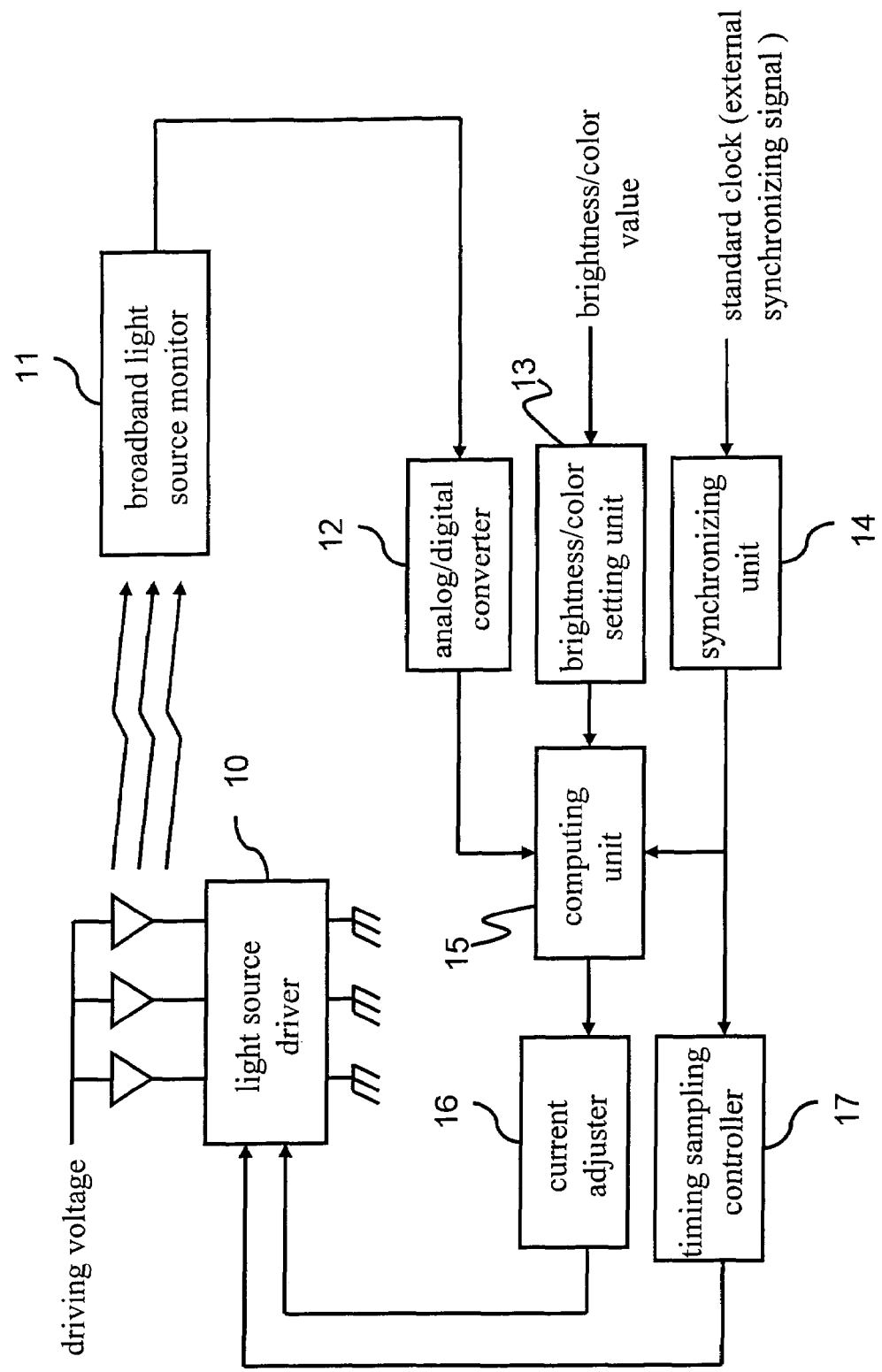
FIG. 2 is a block diagram of the illumination brightness and color control system according to an embodiment of the present invention.

Referring to FIG. 2, it is a block diagram of the illumination brightness and color control system according to an embodiment of the present invention, which includes: a light source driver 10, a broadband light source monitor 11, an analog/digital converter 12, a brightness/color setting unit 13, a synchronizing unit 14, a computing unit 15, a current adjuster 16, and a timing sampling controller 17.

The light source driver 10 is respectively connected to the current adjuster 16 and the timing sampling controller 17, for generating a driving current in response to the control timing (as shown in FIG. 1), so as to drive the diode light source in each wavelength (for example, red, green, or blue light source) to emit lights at different times. The light source driver 10 includes a current driving circuit and a timing control driving circuit in practice.

The broadband light source monitor 11 is used to sense and sample the diode light sources in various wavelengths that emit lights at a specific time for the luminous intensity signal values by a time division manner in response to the sampling timing. The luminous intensity signal value is an analog voltage signal in practice, wherein the broadband light source monitor 11 only requires a single broadband photosensor to carry out the sensing and sampling process. The above-mentioned "broadband" must cover the response spectrum range of light sources in various wavelengths.

The analog/digital converter 12 is connected to the broadband light source monitor 11, for converting the analog luminous intensity signal value sensed by the broadband light source monitor 11 into a digital signal to be output to the computing unit 15.

The brightness/color setting unit 13 is used to set a brightness/color value or to read an externally set brightness/color value. The brightness/color value acts as a reference for adjusting the brightness of the point light source, and it is provided to the computing unit 15 to be computed.

The synchronizing unit 14 receives an external synchronizing signal and generates a corresponding synchronous timing to the computing unit 15 and the timing sampling controller 17 to act as a reference for timing adjustment, thereby synchronizing the computing unit 15 with the timing sampling controller 17.

The computing unit 15 is respectively connected to the analog/digital converter 12, the brightness/color setting unit 13, and the synchronizing unit 14, for carrying out a computation based on the difference between the target brightness/color value and the sensed luminous intensity signal value, so as to acquire a corrected current value, and to transfer the corrected current value into the current adjuster 16. The computing unit 15 can be implemented by a microcontroller unit (MCU) in practice.

The current adjuster 16 is connected to the computing unit 15, for generating a driving current corresponding to the received corrected current value, and driving the current to the light source driver 10 in accordance with the duty cycle and the peak value of the current, so as to correspondingly adjust the driving current generated by the light source driver 10.

The timing sampling controller 17, connected to the synchronizing unit 14, is used to receive the synchronous timing generated by the synchronizing unit 14, thereby generating a plurality of timing signals for adjusting the control timing and sampling timing of the point light source, wherein the control timings are different from each other. Then, the timing signals are transferred to the light source driver 10, for adjusting the control timing and sampling timing. The timing sampling controller 17 can be implemented by a counter circuit and a logic control circuit or microcontroller circuit in practice.

Figure 3:
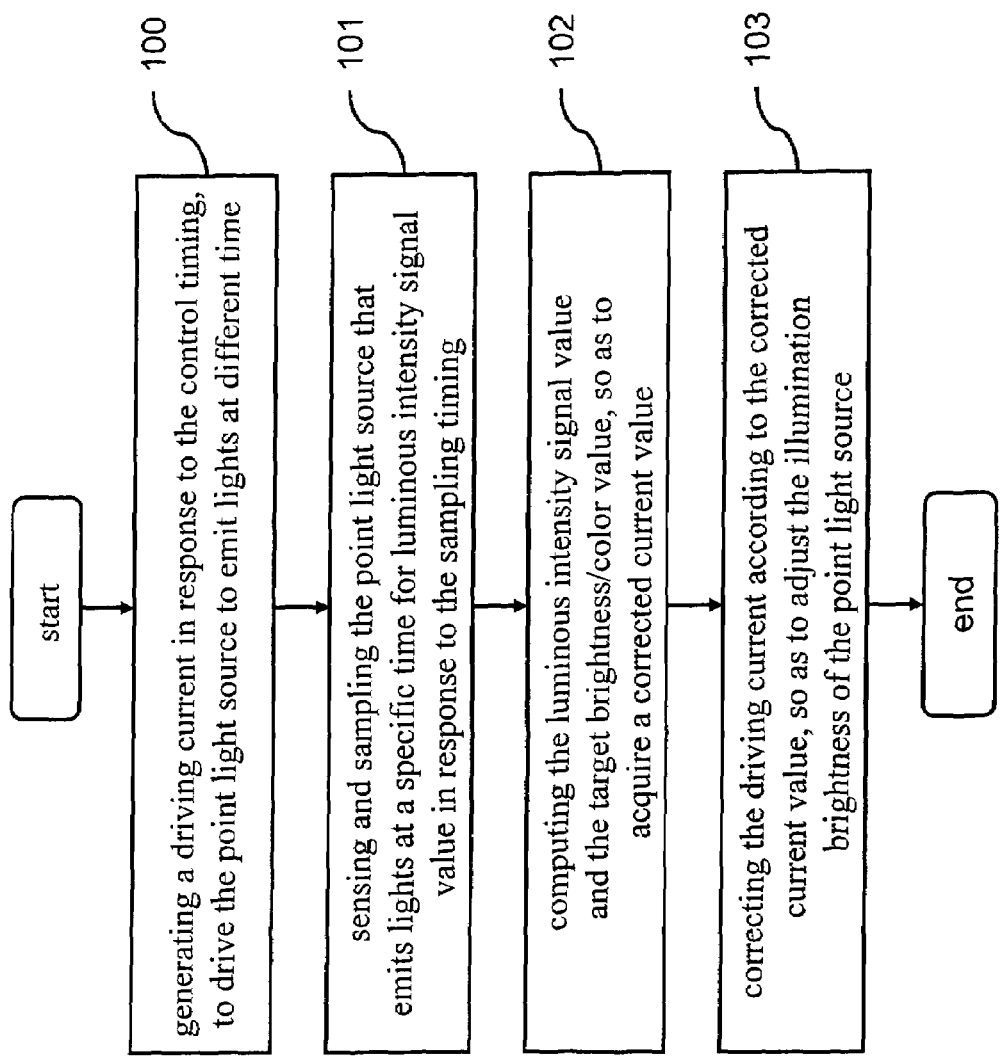
FIG. 3 is a flow chart of the steps of the illumination brightness and color control method according to an embodiment of the present invention.

Referring to FIG. 3, it is a flow chart of the steps of the illumination brightness and color control method according to an embodiment of the present invention, wherein firstly the control timing and sampling timing of the point light source are set in advance, and the above set values are stored in a flash memory; then, a single broadband photosensor is used to sense the point light source, and feedback control the illumination brightness of the point light source. The illumination brightness and color control method includes the following steps: first, the timing sampling controller 17 reads the control timing preset in the flash memory, such that the light source driver 10 generate a driving current in response to the control timing for driving the point light source to emit lights at different time (Step 100); then, the broadband light source monitor 11 reads the sampling timing preset in the flash memory, for sensing and sampling the point light source that emit lights at a specific time for the intensity signal value (Step 101) in a time division manner (as shown in FIG. 1), and converting the luminous intensity signal value into the brightness value based on the gain results obtained in the calibration process.

Then, the computing unit 15 computes the luminous intensity signal value and the target brightness/color value, so as to acquire a corrected current value (Step 102), and transfers the corrected current value into the current adjuster 16, such that the current adjuster 16 corrects the driving current generated by the light source driver 10, thereby adjusting the illumination brightness of the point light source (Step 103).

Figure 4:
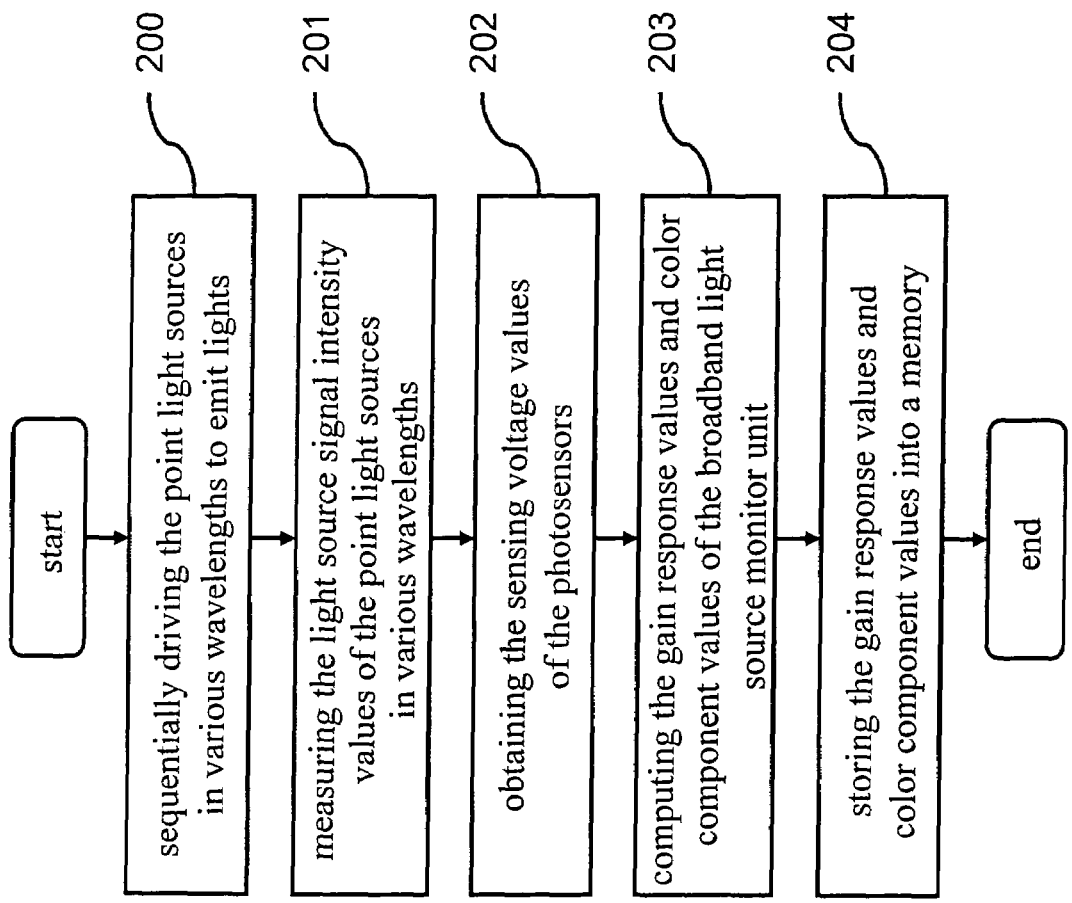
FIG. 4 is a flow chart of the steps of the gain value calibration process of the broadband light source monitor according to an embodiment of the present invention.

Referring to FIG. 4, it is a flow chart of the steps of the calibration process for the gain value of the broadband light source monitor according to an embodiment of the present invention, which includes: first, sequentially driving the point light sources in various wavelengths (RGB) to emit lights (Step 200); measuring the light source signal intensity values and color component values ($L_R, L_G, L_B, X_R, X_G, X_B, Y_R, Y_G, Y_B$) of the point light sources in various wavelengths by a detecting instrument (Step 201); obtaining the sensing voltage values ($V_R, V_G, V_B$) of the photosensor of the broadband light source monitor through the formula V=L*G (Step 202); computing the gain response values ($G_R, G_G, G_B$) and color component values ($X_R,Y_R$), ($X_G,Y_G$), ($X_B,Y_B$) of the broadband light source monitor (Step 203); and storing the gain response values ($G_R, G_G, G_B$) and color component values ($X_R,Y_R$), ($X_G,Y_G$), ($X_B,Y_B$) into a flash memory (Step 204).

According to the illumination brightness and color control system and method therefor, a single broadband photosensor is used to respectively sense and sample the point light source for the luminous intensity signal value in a time division manner, and then the luminous intensity signal value and the target brightness/color value are computed to feedback control the illumination brightness of the point light source. The advantage of employing a single broadband photosensor is that, the calibration process is easy and simple, and the manufacturing cost of the illumination brightness and color control system also can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An illumination brightness and color control system, for adjusting the illumination brightness of a plurality of point light sources according to a target brightness and color value, comprising:

a timing sampling controller, for adjusting a control timing and a sampling timing of each point light source, and generating a plurality of control timings, wherein each control timing is different;

a light source driver, for generating a driving current in response to each control timing, so as to drive the corresponding point light sources, thus the point light sources emit lights at different times;

a broadband light source monitor, for sensing and sampling the point light sources that emit lights at a specific time for a luminous intensity signal value in response to the sampling timing;

a computing unit, for computing and acquiring a corrected current value according to the difference between the brightness/color value and the sensed luminous intensity signal value; and a current adjuster, for adjusting the driving current generated by the light source driver according to the corrected current value.

2. The illumination brightness and color control system according to claim 1, further comprising a synchronizing unit, for synchronizing the computing unit with the timing sampling controller.

3. The illumination brightness and color control system according to claim 1, further comprising an analog/digital converter, for converting the sensed luminous intensity signal value into a digital signal to be output to the computing unit.

4. The illumination brightness and color control system according to claim 1, wherein the broadband light source monitor further comprises a broadband photosensor, for sensing the point light source for the luminous intensity signal value.

5. The illumination brightness and color control system according to claim 1, wherein the broadband light source monitor covers a response spectrum of the driven point light source.

6. The illumination brightness and color control system according to claim 1, wherein the point light source at least comprises a red light source, a green light source, and a blue light source.

7. An illumination brightness and color control method, for setting a control timing and a sampling timing, sensing a point light source with a single broadband photosensor, and feedback controlling the illumination brightness of the point light source, comprising:

generating a driving current in response to the control timing, to drive the point light source to emit lights at different times;

sensing and sampling the point light source that emits lights at a specific time for a luminous intensity signal value in response to the sampling timing;

computing a difference between the luminous sensed intensity signal value and a target brightness/color value, so as to acquire a corrected current value; and correcting the driving current according to the corrected current value, so as to adjust the illumination brightness.

8. The illumination brightness and color control method according to claim 7, wherein the point light source at least comprises a red light source, a green light source, and a blue light source.

9. The illumination brightness and color control method according to claim 7, wherein the broadband photosensor covers a response spectrum of the driven point light source.

* * * * *